United States Patent [19]

Guyot

[11] 4,209,803
[45] Jun. 24, 1980

[54] DEVICE FOR THE ELECTRICAL ANALYSIS OF AN IMAGE

[75] Inventor: Lucien Guyot, Paris, France

[73] Assignee: Thomson-CSF, Paris, France

[21] Appl. No.: 735,045

[22] Filed: Oct. 22, 1976

[30] Foreign Application Priority Data

Oct. 28, 1975 [FR] France .................... 75 32928

[51] Int. Cl.² .................... H04N 1/04; H04N 1/30; G03G 15/00
[52] U.S. Cl. .................... 358/110; 358/209; 358/300; 250/416 TV
[58] Field of Search ............ 358/110, 112, 113, 209, 358/213, 235, 300; 250/315 R, 315 A, 416 TV

[56] References Cited

U.S. PATENT DOCUMENTS

| 3,663,748 | 5/1972 | Boom | 358/300 |
| 3,681,527 | 8/1972 | Nishiyama et al. | 358/300 |
| 3,723,642 | 3/1973 | Laakmann | 358/213 |
| 3,935,455 | 1/1976 | Bogaert | 250/315 A |

Primary Examiner—Robert L. Griffin
Assistant Examiner—Edward L. Coles
Attorney, Agent, or Firm—Roland Plottel

[57] ABSTRACT

A device for furnishing an electrical video signal representing the analysis of an image given in the form of radiated energy. It comprises a mobile carrier, a gas or photo-conductor interacting with the incident radiation in order to furnish a non-uniform distribution of electrical charges upon the carrier, and read out means for reading said charge distribution, delivering an electrical video signal representing a line-by-line analysis of the incident image.

6 Claims, 7 Drawing Figures

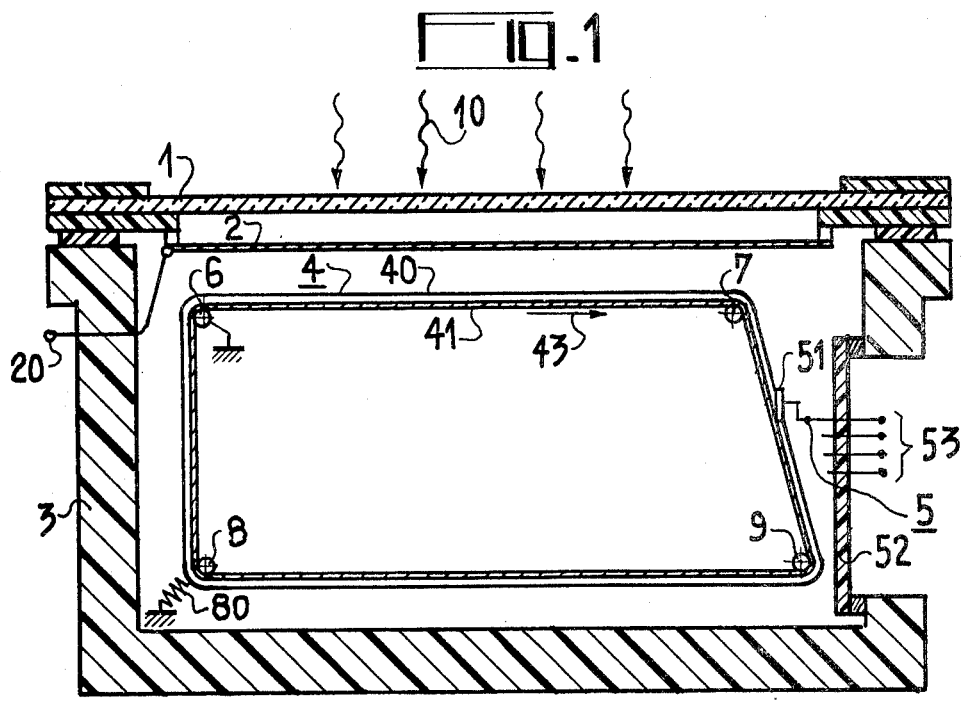
Fig. 1
Fig. 2
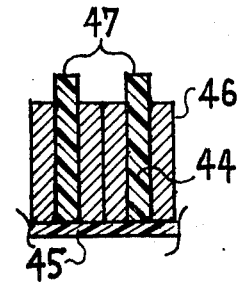
Fig. 3
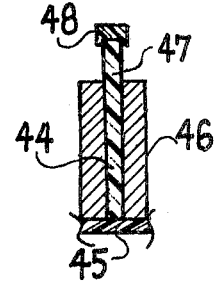
Fig. 4
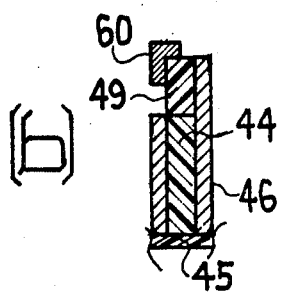
(b)
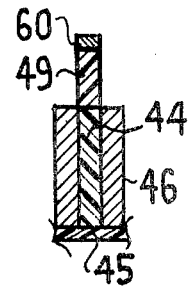
(a)

DEVICE FOR THE ELECTRICAL ANALYSIS OF AN IMAGE

The present invention relates to image analysis and, more particularly, to a device which furnishes an electrical video signal representing the analysis, or in other words scanning, line-by-line, of an image furnished in the form of $\alpha$, $\beta$, $\gamma$, X-ray, infra-red, visible or ultra-violet radiation.

In the fields of medical and industrial radiology in particular, devices are known which make it possible to display and record a visible image which represents the non-uniform intensity of x-ray radiation which has previously passed through a given object, this for example by the excitation of a luminescent screen or the direct printing of a photographic film. The problems of sensitivity encountered in these systems are tackled by the addition of electronic image-intensifier tubes or television cameras, optically coupled to the luminescent screen. However, the poor efficiency of the optical systems gives rise to a major deterioration in the information originally carried in the form of X-ray radiation. Another method of resolving this problem is to use an electronic image converter tube which comprises a luminescent screen inside an image-intensifier tube and furnishes visible images with very little loss of initial information. However, these devices have limitations which are due to the difficulties associated with the creation of sufficiently large optical input fields.

Finally, devices are known which, by interaction between X-rays and gas or between X-rays and a photoconductor, make it possible to store a distribution of electrical charges representing the initial X-ray information, this charge distribution being subsequently readout by development using electrically charged coloured particles in a dry or liquid medium. These devices, however, do not enable direct display (radioscopy) to be achieved but simply furnish a recording (radiography).

An object of the present invention is to provide a device which furnishes an electrical video signal representing the analysis, or in other words scanning, line-by-line, of incident image which is in the form of an incident stream either of charged particle ($\alpha$, $\beta$ radiation) or X-ray, $\gamma$, infra-red, visible or ultra-violet radiation, this device making it possible to receive large-format images and having a high information capacity.

According to the invention, there is provided a device for the electrical analysis of an image furnished in the form of an incident stream, comprising:

a mobile carrier;

first means for producing a non-uniform spatial distribution of electrical charges on said carrier, said distribution being a function at any point, of the intensity of said image;

second means for electricaly read-out said charge distribution, furnishing an electrical video signal representing the line-by-line analysis of said image, said lines being substantially perpendicular to the direction of displacement of the carrier.

For a better understanding of the invention and to show how it can be carried in to effect, reference will be made to the following description and the related drawings, in which:

FIG. 1 is a diagram of an embodiment of the device in accordance with the invention;

FIGS. 2 to 4 are variant embodiments of a mobile carrier used in the device in accordance with the invention;

Figure 5:
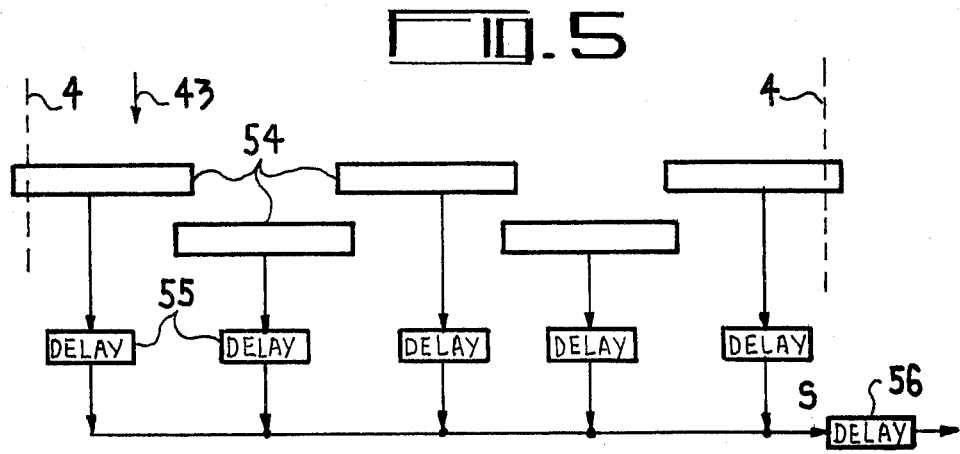
FIGS. 5, 6 and 7 are variant embodiments of means for reading out used in the device in accordance with the invention.

In FIG. 1, a rigid vessel 3 capable of withstanding a high internal gas pressure (in the order of some few tens of kg per $cm^2$), closed by a transparent wall 1 which constitutes the input windows of the device, has been shown. The wall 1 is made of a material having a low atomic number Z, such as glass plate, a thin metal plate (titanium or alloys of titanium and vanadium, aluminium alloys) or a fibre-glass reinforced plastic plate. The input window 1 can be flat, as shown in the figure; it could equally well be curved (concavely or convexly) in order to increase its resistance to external pressure. In the proximity of the window 1 a thin conductive electrode 2 is arranged, connected to an external terminal 20. In the enclosure 3 there is a carrier in the form of a belt 4 which moves around capstans (6,7,8 and 9 in the figure) with a substantially uniform motion, parallel to the electrode 2 in a part of its path, a spring 80 being provided in order to tension the belt 4. The belt 4 is constituted by an electrically insulating band 40 facing the electrode 2, and a thin metal film 41 at the other face. By way of example, the belt 4 can be constituted by a continuous film of Mylar or Capton (Registered Trade Marks) 10 to 20 $\mu$m in thickness, metallised on the face (41) which cooperates with the capstans (6 to 9); the electrode 2 is constituted by a thin sheet of aluminium, beryllium, magnesium or gold, the latter being preferable in the case of X-ray radiation because it facilitates the multiplier mechanism.

The device shown in FIG. 1 furthermore comprises read-out means 5 for reading out the charges carried by the carrier 4, said means being constituted by a read-out head 51, the embodiments of which have been described at a later point in the description, carried by a component 52 which closes off the vessel 3, the component 52 having a plurality of sealed openings through which, via input/outputs 53, useful signals can be supplied for processing at the video signal head 51 (supply, clock signals etcetera).

In operation, an incident stream 10 of X-rays is received at the window 1; the incident stream could also be constituted by $\gamma$ rays of by ionising $\alpha$ or $\beta$ particles. The vessel 3, in a first embodiment, is filled with a gas such as xenon or argon, possibly with the addition of neon, nitrogen, water or methane or carbon dioxide, in order to promote ionisation.

A high voltage is applied between the electrode 2 (terminal 20) and the metal part 41 of the belt 4, for example in the manner shown in the figure, the electrode 2 being negative and the belt 4 at the reference potential through the medium of one of the capstans.

The radiation 10 after having passed through the window 1 and the electrode 2, ionises the gas contained in the vessel 3 and gives rise to the deposition of charges in particular upon the insulating part 40 of the carrier 4, in accordance with a non-uniform spatial distribution which is a function at all points, of the received X-ray dose.

Since, during a second phase, the carrier 4 performs a substantially uniform motion (arrow 43), the various points on its surface pass in front of the read-out head 51 which, either in destructive fashion or otherwise, as detailed later on, determines the value of the charge at each point in a line on the belt (that is to say perpendicularly to the direction of belt motion) this in line-by-line fashion. At the outputs 53, the corresponding electrical video signal is obtained.

As far as the motion of the belt is concerned, this may either be continuous, in which case the bombardment time is very short (of the order of a millisecond), or may be interrupted during the whole of the time of bombardment if said time is long.

After read-out, in particular if non-destructive read-out is involved, the belt is discharged uniformly in order to begin a fresh recording sequence. A variant mode of operation, again taking the case of non-destructive read-out, is one in which the belt is not discharged after read-out but the direction of the electric field applied between the belt 4 and the electrode 2 is reversed when the belt returns to its original position; fresh bombardment produces charges of opposite sign to that of the charges already accumulated on the belt; the resultant final charge then translates the variations in the incident image between the two phases of irradiation.

FIG. 2 illustrates a variant embodiment of the carrier 4 shown in FIG. 1, in the plane normal to the direction of transfer of the carrier. The carrier 4 is not continuous but is constituted by an assembly of thin, insulating plates 44 arranged (stuck for example) in abutment with one another on an insulating belt 45; the plates 44 are covered by metallised surfaces 46 on their vertical walls, leaving a terminal portion 47 constituting the charge storage capacitance. Each plate 44 is in electrical contact with its neighbours (this being the case shown in the figure where, for the sake of clarity, the metallised surfaces 46 had been shown extremely thick in relation to the width of the plates 44) in order to form a line of stored charges in a direction normal to the direction of belt transfer, the different lines being separated from one another. The advantage of this kind of arrangement resides in the insulation of one storage element (47) from its neighbours, this reducing the kind of cross-talk which may exist at the time of read-out.

In a variant embodiment of the device in accordance with the invention, the interaction between the incident radiation and the gas is replaced by an interaction between the incident radiation and a photo-conductor. In this case, the incident radiation may be visible, ultra-violet or infra-red.

The photo-conductor, such as a compound of selenium, SeAs, SeAsTe or PbO, then constitutes part of the carrier 4 in the same way that the insulator 40 did in the FIG. 1 and it is covered in the same way with a metallised film (41). The electrode 2 is discarded and the input window (1), in FIG. 1, is transparent to the incident radiation: it may be for example be constituted by glass, silica or germanium for example.

In operation, it is not necessary therefore to fill the vessel with gas under high pressure but it is preferable to introduce into it a dry gas at ambient pressure in order to limit the ageing phenomena occurring in the photo-conductor, due to corrosion. Prior to bombardment, the surface of the photo-conducteur is uniformly charged, by corona effect for example. After bombardment, the surface of the photo-conductor is locally discharged as a function of the intensity of the incident radiation. The residual charges are read-out as in the case described earlier when they resulted from the interaction between radiation and gas.

FIGS. 3 and 4 illustrate variant embodiments of the carrier 4 in the case where it carries a photo-conductor in an arrangement very similar to that shown in FIG. 2. An insulating belt 45 carries plates 44 attached there by an adhesive for example, said plates being metallised (46) over the whole of their surface except at the end 47 which is covered by a photo-conductor 48 (FIG. 3).

In FIG. 4a, the photo-conductor (here marked 49) constitutes the top part of the plate 44 which is either an insulator or a conductor and is covered by a metallised finish 46. The photoconductor 49 is covered by a floating electrode 60 designed to pick up the charges on the photo-conductor. The material 49 is for example constituted by an organic photo-conductor such as polyvinylcarbazole in the case of incident ultra-violet radiation. FIG. 4b is a variant embodiment of FIG. 4a in which the floating electrode 60 does not occupy the same position on the photo-conductor 49; it is now in the form of a corner at a top angle of the photo-conductor 49.

Figure 6:
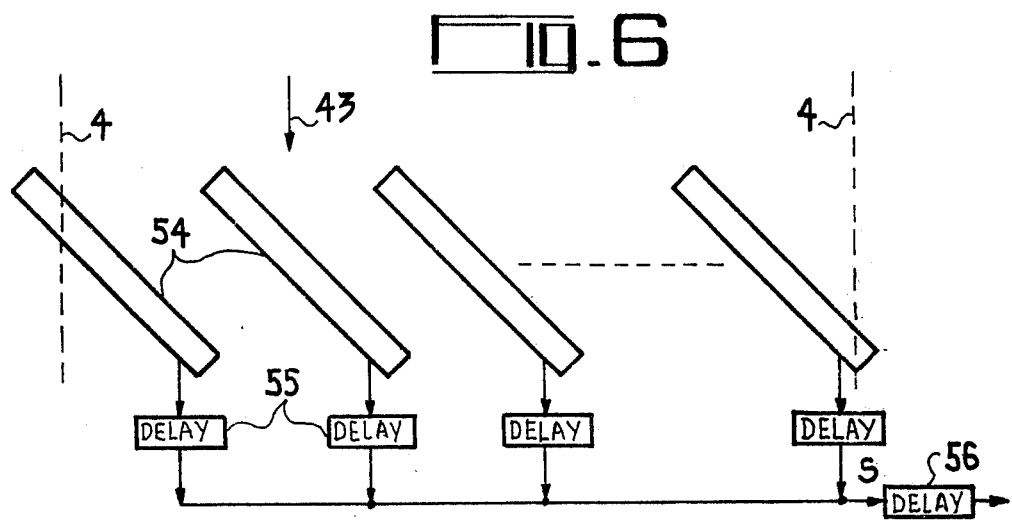
Figure 7:
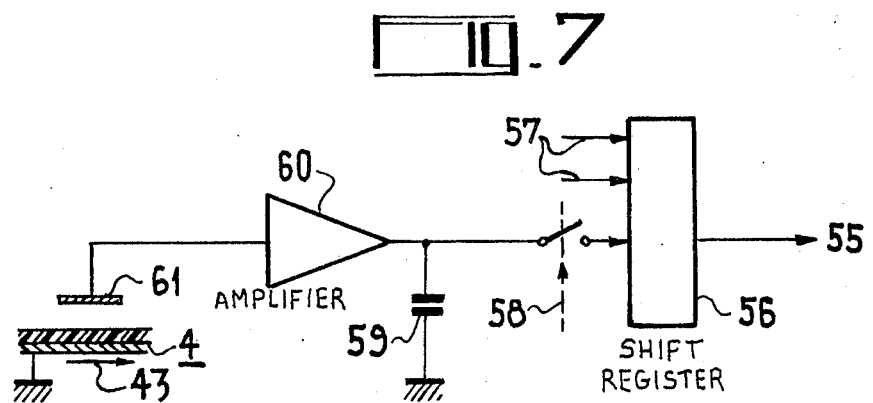

FIGS. 5, 6 and 7 illustrate different embodiments of the charge read-out means of the device in accordance with the invention.

In FIGS. 5 and 6 there have been illustrated the belt or carrier 4 (broken lines), the direction of displacement of the belt (arrow 43) and plates 54 each carrying a certain number of elementary pick-ups, the design of said pick-ups being shown in detail in FIG. 7. The plates 54 are arranged either in a staggered pattern (FIG. 5) or in a herring bone pattern (FIG. 6), in sufficient numbers to cover the whole width of the belt 4. The different plates 54 are each connected to a delay line 55 which makes it possible to delay the signal furnished by the plate, by a time which matches its geometric position in relation to the belt 4, in order to furnish a single signal S translating the information stored in a line disposed perpendicularly (FIG. 5) or obliquely (FIG. 6) in relation to the direction of displacement of the belt. In this fashion successive video signals representing the line-scanning of the incident image, are obtained.

The devices shown in FIGS. 5 and 6 comprise another delay line 56 designed to delay (in a variable fashion) the line signal S in order to compensate for any irregularity in the transfer of the belt, the transfer motion being performed mechanically.

The assembly of the plates 54 constitutes the read-out head marked 51 in FIG. 1. The delay lines 55 and 56 can either be incorporated into the head 51 or arranged outside the enclosure 3.

FIG. 7 illustrates the diagram of an embodiment of the elementary charge pick-ups, in the situation where the read-out is performed non-destructively. Each of the pick-ups comprises an elementary electrode 61 defining an elementary image area, arranged in proximity of the belt 4. The potential on the electrode 61 is then determined by the value of the charge accumulated on the belt 4 in this elementary area. The electrode 61 is connected to an amplifier 60, itself connected to a storage capacitance 59 which makes it possible to integrate the amplified current resulting either from the detected voltage or from the detected charge, this over a time which depends upon the rate of displacement of the belt 4 in front of the electrode 61. The capacitor 59 is therefore connected between the belt reference potential (earth) and the output of the amplifier 60 and, through this latter connection, to one of the inputs of a shift-register 56 through the medium of a control arrangement 58 controlling the transfer of the signal between these two elements. The output of the register 56 is connected towards a delay line 55.

One practical embodiment consists in integrating a certain number (n) of elementary electrodes (61) on to one and the same substrate (plates 54 in FIGS. 5 and 6), together with the n amplifiers 60, and n capacitors (59) which correspond with them, each plate 54 then carrying a register (56) with n inputs. By way of example, this type of register may be of the charge-coupled device (CCD) kind, with two or three phases, in which the application of a clock signal makes it possible to sequentially obtain the information read-out by each elementary electrode (61), thus forming the video signal. Still by way of example, the delay lines 55 and 56 may be constituted by conventional delay lines or by analogic rotary stores of the CCD type.

In another embodiment (not shown), destructive read-out of the charges is performed by establishing contact between the read-out plate and the belt in proximity of and downstream of the elementary electrodes. It is then possible to incline the read-out electrodes in relation to the belt, making it possible to vary the size of the air-gap.

In a variant embodiment, this not having been shown in the figures either, the device includes a system for contour correction. In other words, if the value of the air-gap between the belt (4) and the read-out head (51) becomes large in relation to the dimensions of the elementary image area (width of the elementary electrode 61 and length traversed by the belt during the time taken to integrate the signal), the information picked up by the elementary electrode (61) is not limited to a charge carried by the corresponding area of the belt 4, but also includes an information fraction which is due to the elements located in the neighbourhood of the elementary area in question. In other words, the value of the modulation transfer function of the signal becomes attenuated at high spatial frequencies. This inaccuracy is compensated for by correction of the contour: it is possible, for example, in each line, to subtract from the signal coming from an elementary electrode, the information picked up by the adjacent electrodes. In the field sense (using the word field in the scanning context) this operation can be performed by means of line stores which make it possible to perform the same compensation over three successive lines.

It is also possible to perform this correcting operation on the contour, at the level of the detection plate (54), the complexity of this latter being further increased as a consequence: a single line of elementary electrodes (61) is replaced by three parallel lines of electrodes supplying three series of amplifiers (60). The integrating capacitance (59) is then simultaneously charged up by the amplifier of an element in the central line and discharged by the two amplifiers, of the same order, belonging to the lateral lines, an appropriate weighting coefficient being introduced.

In this way, a device for electrical image analysis (scanning) is created which in particular has the following advantages:

it can handle incident images of large format (of the order of 1 500 cm$^2$);

it has only a small size considered along the axis of the incident radiation;

it makes it possible to provide downstream as it were, a conventional image intensifier having only a small optical input field;

it has a high information capacity (more than 2 000 points per line);

it makes it possible to process the signal at the level of the read-out heads themselves;

it makes it possible to read-out a charge relief created by any ionising particle ($\alpha$, $\beta$, $\gamma$, X-ray) and, in the case of a belt covered by a photo-conductor, to read-out any ultra-violet, visible or even infra-red (near or far) radiation.

The description given hereinbefore is intended purely by way of non-limitative example. Thus, the present invention covers variant embodiments such as the replacement of the continuous electrical charge carrier belt by a storage type belt which can be re-wound for fresh use.

What is claimed:

1. A device for the electrical analysis of an image furnished in the form of an incident stream, comprising: a single mobile carrier; first means for producing a non-uniform spatial distribution being a function at any point, of the intensity of said image; second means for capacitively providing an electrical reading-out of said charge distribution, furnishing an electrical video signal representing a line-by-line analysis of said image, said lines being substantially perpendicular to the direction of displacement of the carrier; said first means; said device further comprising a third means for applying a potential difference across said gas, said carrier being an insulator and being arranged in the gas so that said charge distribution is constituted by the electrical charges which have been liberated by the ionisation of said gas.

2. A device as claimed in claim 1, further comprising an input window receiving said incident stream and a transparent electrode arranged substantially parallel to and in proximity of said window, said carrier taking the form of a belt performing a substantially uniform translatory motion, said belt comprising an insulating part opposite the window, and a conductive part, said potential difference being applied between said conductive part and said electrode.

3. A device as claimed in claim 2, wherein said conductive part of said carrier is constituted by, arranged upon said insulating part of said belt, insulating plates metallised over the whole of their area, excepted that of their ends opposite to said belt, said plates being arranged side-by-side in order to be in electrical contact with one another in the direction of said lines of analysis.

4. A device for the electrical analysis of an image furnished in the form of an incident stream, comprising: a single mobile carrier; first means for producing a non-uniform spatial distribution of electrical charges on said carrier, said distribution being a function at any point, of the intensity of said image; second means for capacitively providing an electrical reading-out of said charge distribution, furnishing an electrical video signal representing a line-by-line analysis of said image, said lines being substantially perpendicular to the direction of displacement of the carrier; said first means comprising a photo-conductor material arranged upon said carrier; third means for producing a uniform deposit of electrical charges on the photo-conductor prior to bombardment thereof by said incident stream, said non-uniform charge distribution by said bombardment; said device further comprising an input window receiving said incident stream, said carrier comprising, deposited upon an insulating belt, insulating plates which are metallised over the whole of their area except that of their end are opposite to said belt, said latter end being with a layer of said photo-conductive material, said plates being arranged side-by-side in order to be in electrical contact with one another in the direction said lines of analysis.

5. A device as claimed in claim 4, wherein said carrier further comprises a floating electrode deposited upon at least part of said photo-conductor.

6. A device for the electrical analysis of an image furnished in the form of an incident stream, comprising: a single mobile carrier; first means for producing a non-uniform spatial distribution of electrical charges on said carrier, said distribution being a function at any point, of the intensity of said image; second means for capacitively providing an electrical reading-out of said charge distribution, furnishing an electrical video signal representing a line-by-line analysis of said image, said lines being substantially perpendicular to the direction of displacement of the carrier; said second means comprising an elementary pickup for each elementary read-out area, said pick-ups being connected to shift-registers in order to furnish said electrical video signal, which represents the data readout by each pick-up sequentially; each of said elementary pick-ups comprising an elementary electrode arranged in proximity of said carrier and charged by capacitive effect, said elementary electrode being connected to an amplifier which is itself connected to a capacitor furnishing an integrated signal; and said second means further comprise at least one delay line connected to each shift register.

* * * * *